(12) United States Patent
Nguyen et al.

(10) Patent No.: US 6,705,400 B1
(45) Date of Patent: Mar. 16, 2004

(54) METHODS AND COMPOSITIONS FOR FORMING SUBTERRANEAN FRACTURES CONTAINING RESILIENT PROPPANT PACKS

(75) Inventors: Philip D. Nguyen, Duncan, OK (US); Johnny A. Barton, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 63 days.

(21) Appl. No.: 10/229,587

(22) Filed: Aug. 28, 2002

(51) Int. Cl.⁷ .............................................. E21B 43/267
(52) U.S. Cl. ..................... 166/281; 166/280; 166/295; 166/308; 523/131; 507/219; 507/220; 507/221; 507/231; 507/239; 507/922; 507/924
(58) Field of Search ................................ 523/130, 131; 507/219, 220, 221, 231, 239, 922, 924; 166/308, 280, 281, 283, 295, 294

(56) References Cited

U.S. PATENT DOCUMENTS

| | | |
|---|---|---|
| 4,042,032 A | 8/1977 | Anderson et al. |
| 4,070,865 A | 1/1978 | McLaughlin |
| 4,074,760 A | 2/1978 | Copeland et al. |
| 4,336,842 A | 6/1982 | Graham et al. |
| 4,829,100 A | 5/1989 | Murphey et al. |
| 5,128,390 A | 7/1992 | Murphey et al. |
| 5,381,864 A | 1/1995 | Nguyen et al. |
| 5,393,810 A | 2/1995 | Harris et al. |
| 5,529,123 A | 6/1996 | Carpenter et al. |
| 5,609,207 A | 3/1997 | Dewprashad et al. |
| 5,839,510 A | 11/1998 | Weaver et al. |
| 5,921,317 A | 7/1999 | Dewprashad et al. |
| 5,924,488 A | 7/1999 | Nguyen et al. |
| 5,960,880 A | 10/1999 | Nguyen et al. |
| 6,003,600 A | 12/1999 | Nguyen et al. |
| 6,016,870 A | 1/2000 | Dewprashad et al. |
| 6,098,711 A | 8/2000 | Chatterji et al. |
| 6,234,251 B1 | 5/2001 | Chatterji et al. |
| 6,271,181 B1 | 8/2001 | Chatterji et al. |
| 6,311,773 B1 | 11/2001 | Todd et al. |
| 6,328,106 B1 | 12/2001 | Griffith et al. |
| 6,330,917 B2 | 12/2001 | Chatterji et al. |
| 6,401,817 B1 | 6/2002 | Griffith et al. |
| 6,632,527 B1 * | 10/2003 | McDaniel et al. .......... 428/402 |

OTHER PUBLICATIONS

W. W. Almond et al, "Factors Affecting Proppant Flowback with Resin Coated Proppants" SPE 30096 (1995 European Formation Damage Conference, May 15–16, 1995).

* cited by examiner

*Primary Examiner*—Zakiya Walker
(74) *Attorney, Agent, or Firm*—Robert A. Kent; C. Clark Dougherty, Jr.

(57) ABSTRACT

Improved methods of forming fractures containing resilient proppant particle packs which prevent the production of sand and fines with produced fluids and prevent proppant flow-back in a subterranean zone penetrated by a well bore are provided. As the fractures are formed, a liquid hardenable resin component is mixed with a liquid hardening agent component and a liquid rubber component to form a hardenable resin composition. The hardenable resin composition is coated onto dry proppant particles which are suspended in the fracturing fluid and placed in the fractures. The hardenable resin composition on the resin composition coated proppant particles is allowed to harden and consolidate the proppant particles into high strength resilient permeable packs.

34 Claims, No Drawings

METHODS AND COMPOSITIONS FOR FORMING SUBTERRANEAN FRACTURES CONTAINING RESILIENT PROPPANT PACKS

BACKGROUND OF THE INVENTION

1. Field of the Invention

The present invention relates to improved methods of forming fractures containing resilient proppant particle packs which prevent proppant flow-back in subterranean zones penetrated by well bores.

2. Description of the Prior Art

Hydrocarbon producing wells are often stimulated by hydraulic fracturing treatments. In hydraulic fracturing treatments, a viscous fracturing fluid which also functions as a carrier fluid is pumped into a producing zone to be fractured at a rate and pressure such that one or more fractures are formed in the zone. Particulate proppant particles, e.g., graded sand for propping the fractures are suspended in a portion of the fracturing fluid so that the proppant particles are deposited in the fractures when the fracturing fluid is broken. That is, a breaker is included in the fracturing fluid whereby the fracturing fluid reverts to a thin fluid which is returned to the surface. The proppant particle packs formed in the fractures function to prevent the fractures from closing so that conductive channels are formed through which produced hydrocarbons can readily flow.

In order to prevent the subsequent flow-back of the proppant particles as well as loose or incompetent sand in the fractured zone with fluids produced therefrom, the proppant introduced into the fractures has heretofore been coated with a hardenable resin composition which is caused to harden and consolidate the proppant particles in the zone. The flow-back of the proppant particles with formation fluids is very detrimental in that it erodes metal goods, plugs piping and vessels and causes damage to valves, instruments and other production equipment.

While the consolidated proppant particle packs heretofore formed in subterranean fractures have functioned satisfactorily in wells which are produced continuously, when such consolidated proppant particle packs are formed in wells which are frequently placed on production and then shut-in, flow-back of the proppant particles and formation fines with produced fluids often still takes place. That is, in wells which are subjected to stress cycling due to frequent opening and shutting in of the wells, the consolidated proppant particle packs in fractures are also subjected to the stress cycling which causes the consolidated proppant particle packs to disintegrate and the flow-back of loose proppant particles to occur. Thus, there are needs for improved methods of forming proppant particle packs in subterranean fractures which are resilient and do not disintegrate when subjected to stress cycling.

SUMMARY OF THE INVENTION

The present invention provides improved methods and compositions for forming subterranean fractures containing resilient proppant particle packs which meet the needs described above and overcome the deficiencies of the prior art. The resin compositions of this invention harden and consolidate resin coated proppant particles into resilient permeable packs which do not allow proppant flow-back.

The methods of this invention are basically comprised of the following steps. A liquid hardenable resin component is provided comprised of a hardenable resin and optionally, a solvent for the resin. A liquid hardening agent component is provided comprised of a hardening agent, a silane coupling agent, a hydrolyzable ester for breaking gelled fracturing fluid films on the proppant particles, a surfactant for facilitating the coating of the resin on the proppant particles and for causing the hardenable resin to flow to the contact points between adjacent resin coated proppant particles, a liquid carrier fluid having a high flash point and optionally, a viscosifying agent for viscosifying the carrier fluid and dispersing the hardening agent when the hardening agent is a particulate solid. A liquid rubber component comprised of a rubber latex and a rubber latex stabilizing surfactant is also provided. In addition, a source of dry proppant particles and a gelled liquid fracturing fluid are provided. The gelled liquid fracturing fluid is pumped into a subterranean zone to form the fractures therein and to place hardenable resin composition coated proppant particles therein. As the fractures are formed by the fracturing fluid, the liquid hardenable resin component is mixed with the liquid hardening agent component and the liquid rubber component (preferably on-the-fly) to form a liquid hardenable resin composition. The liquid hardenable resin composition is continuously coated on dry proppant particles conveyed from the source thereof to form hardenable resin composition coated proppant particles. The hardenable resin coated proppant particles are continuously mixed with the fracturing fluid whereby the hardenable resin composition coated proppant particles are suspended in the fracturing fluid. When the hardenable resin composition coated proppant particles have been placed in the one or more fractures, the pumping of the fracturing fluid, the mixing of the liquid hardenable resin component with the liquid hardening agent component and the liquid rubber component, the coating of the dry proppant particles with the hardenable resin composition and the mixing and suspending the resin composition coated proppant particles with the fracturing fluid are terminated. Thereafter, the hardenable resin composition on the coated proppant particles is allowed to harden and to consolidate the proppant into one or more strong and resilient permeable packs which prevent the production of formation sand and fines with formation fluids and proppant flow-back.

The liquid hardenable resin composition of this invention for consolidating proppant particles in subterranean fractures whereby consolidated proppant particle packs are formed which are resilient and prevent proppant particle flow-back due to stress cycling is comprised of the following components: a hardenable resin, optionally a solvent for the resin, a hardening agent for hardening the resin, a silane coupling agent, a hydrolyzable ester for breaking gelled fracturing films on the proppant particles, a surfactant for facilitating the coating of the resin on the proppant particles and for causing the hardenable resin to flow to the contact points between adjacent resin coated proppant particles, a liquid carrier fluid having a high flash point and optionally, a viscosifying agent for viscosifying the carrier fluid and dispersing the hardening agent when the hardening agent is a particulate solid, a rubber latex and a rubber latex stabilizing surfactant.

The objects, features and advantages of the present invention will be readily apparent to those skilled in the art upon a reading of the description of preferred embodiments which follows.

DESCRIPTION OF PREFERRED EMBODIMENTS

As mentioned above, the consolidated proppant particle packs formed in fractures heretofore have not been resilient enough to remain consolidated in wells which are frequently placed on production and shut-in. That is, the stress cycling caused by frequently producing and shutting in wells causes the consolidated proppant particle packs to disintegrate over time which causes undesirable proppant particle flow-back.

In accordance with the methods and compositions of the present invention, the resin consolidated proppant particle packs formed in subterranean fractures are highly resilient whereby they can withstand stress cycling without disintegration occurring.

The methods of the present invention for forming fractures containing resilient proppant particle packs which prevent the production of formation sand and fines with formation fluids and proppant flow-back in subterranean zones penetrated by well bores are comprised of the following steps. A liquid hardenable resin component is provided comprised of a hardenable resin, and optionally, a solvent for the resin having a high flash point. A liquid hardening agent component is also provided comprised of a hardening agent, a silane coupling agent, a hydrolyzable ester for breaking gelled fracturing fluid films on the proppant particles, a surfactant for facilitating the coating of the resin on the proppant particles and for causing the hardenable resin to flow to the contact points between adjacent coated proppant particles, a liquid carrier fluid having a high flash point and optionally, a viscosifying agent for viscosifying the carrier fluid and dispersing the hardening agent when the hardening agent is a particulate solid. A liquid rubber component comprised of a rubber latex and a rubber latex stabilizing surfactant is also provided. In addition, a source of dry proppant particles and a gelled liquid fracturing fluid are provided. The gelled liquid fracturing fluid is pumped into the subterranean zone to form fractures therein and to place hardenable resin composition coated proppant particles therein. As the fractures are formed, the liquid hardenable resin component is mixed with the liquid hardening agent component and the liquid rubber component (preferably on-the-fly) to form a liquid hardenable resin composition. The liquid hardenable resin composition is continuously coated onto dry proppant particles (preferably on-the-fly) conveyed from the source thereof to form hardenable resin composition coated proppant particles. The hardenable resin composition coated proppant particles are continuously mixed with the fracturing fluid being pumped (preferably on-the-fly) whereby the hardenable resin composition coated proppant particles are suspended therein. When the resin composition coated proppant particles have been placed in the fractures, the pumping of the gelled liquid fracturing fluid, the mixing of the liquid hardenable resin component with the liquid hardening agent component and the liquid rubber component to form the liquid hardenable resin composition, the coating of the liquid hardenable resin composition onto dry proppant particles and the mixing of the hardenable resin composition coated proppant particles with the fracturing fluid are terminated. Thereafter, the hardenable resin composition on the resin composition coated proppant particles is allowed to harden and consolidate the proppant particles into resilient permeable packs which prevent the production of formation sand and fines with produced fluids and proppant flow-back.

The term "on-the-fly" is used herein to mean that a flowing stream is continuously introduced into another flowing stream so that the streams are combined and mixed while continuing to flow as a single stream. While the mixing of the liquid hardenable resin component with the liquid hardening agent component and the rubber component to form the hardenable resin composition, the coating of the dry proppant particles with the hardenable resin composition and the mixing of the hardenable resin coated proppant particles with the fracturing fluid are all preferably accomplished on-the-fly, as is well understood by those skilled in the art such mixing can also be accomplished by batch mixing or partial batch mixing.

As is also well understood, when the fracturing fluid is broken and the hardenable resin composition coated proppant particles are deposited in the fractures formed, the fractures close on the proppant particles. The partially closed fractures apply pressure on the hardenable resin composition coated proppant whereby the proppant particles are forced into contact with each other while the resin composition hardens. The hardening of the resin composition under pressure helps bring about the consolidation of the resin coated particles into a hard permeable pack having sufficient compressive strength to prevent unconsolidated proppant and formation sand from flowing out of the fractures with produced fluids. In fracture treatments carried out in unconsolidated formations, good consolidation of proppant is required in the perforations which extend from the inside of the well bore through casing and cement into the unconsolidated formation as well as in the fractured portions of the unconsolidated formation surrounding the well bore. The last portion of the proppant which is deposited in the perforations and in the fractures is coated with the hardenable resin composition and is caused to harden. The resulting consolidated proppant in the perforations and fractures contributes to the prevention of proppant flow-back. However, there is often little closure pressure applied to the hardenable resin coated proppant in the fractures close to the well bore and there is no closure pressure applied to the hardenable resin coated proppant particles in the perforations. In addition, the hardenable resin coated proppant particles can be separated from each other by films of the gelled fracturing fluid and because of the presence of the fracturing fluid films, the proppant particles do not sufficiently consolidate. As a result, the consolidated permeable packs formed in the perforations and fractures often have less than sufficient compressive strength to prevent unconsolidated proppant and formation sand from flowing out of the perforations and fractures. These problems are solved by including in the hardenable resin composition one or more hydrolyzable esters which function to break gelled fracturing fluid films on the particles, and a surfactant for facilitating the coating of the resin composition on the proppant particles and for causing the hardenable resin composition to flow to the contact points between adjacent resin coated proppant particles so that the particles are consolidated into a high strength permeable mass.

Examples of hardenable resins which can be utilized in the liquid hardenable resin component include, but are not limited to, organic resins such as bisphenol A-epichlorohydrin resin, polyepoxide resin, novolac resin, polyester resin, phenol-aldehyde resin, urea-aldehyde resin, furan resin, urethane resin, glycidyl ethers and mixtures thereof. Of these, bisphenol A-epichlorohydrin resin is preferred. The organic resin utilized is included in the liquid hardenable resin component in an amount in the range of from about 70% to about 100% by weight of the liquid hardenable resin component, preferably an amount of about 85%.

Examples of solvents having high flash points (above about 125° F.) which can optionally be used for the hardenable resin in the liquid hardenable resin component include, but are not limited to, dipropylene glycol methyl ether, dipropylene glycol dimethyl ether, dimethyl formamide, diethylene glycol methyl ether, ethylene glycol butyl ether, diethylene glycol butyl ether, propylene carbonate, d'limonene and fatty acid methyl esters. Of these, dipropylene glycol methyl ether is preferred. The amount of the solvent utilized in the liquid hardenable resin component is in the range of from about 0% to about 30% by weight of the liquid hardenable resin component, preferably an amount of about 15%.

Examples of the hardening agents which can be used in the liquid hardening agent component include, but are not limited to, amines, aromatic amines, polyamines, aliphatic amines, amides, polyamides, 4,4'-diaminodiphenyl sulfone, 2-ethyl-4-methyl imidazole and 1,1,3-trichlorotrifluoroacetone. Of these, 4,4'-diaminodiphenyl sulfone is preferred. The hardening agent is included in the liquid hardening agent component in an amount in the range of from about 30% to about 60% by weight of the liquid hardening agent component, preferably in an amount of about 40%.

Examples of silane coupling agents which can be used in the liquid hardenable resin component include, but are not limited to, N-2-(aminoethyl)-3-aminopropyltrimethoxysilane, 3-glycidoxypropyltrimethoxysilane and n-beta(aminoethyl)-gamma-aminopropyltrimethoxysilane. Of these, n-beta-(aminoethyl)gamma-aminopropyltrimethoxysilane is preferred. The silane coupling agent is included in the liquid hardenable resin component in an amount in the range of from about 0.1% to about 3% by weight of the liquid hardenable resin component, preferably in an amount of about 1.5%.

Examples of hydrolyzable esters which can be used in the liquid hardenable resin component for facilitating the coating of the resin composition on the proppant particles and for breaking gelled fracturing fluid films thereon include, but are not limited to, a mixture of dimethylglutarate, dimethyladipate and dimethylsuccinate, sorbitol, catechol, dimethylthiolate, methyl salicylate, dimethyl salicylate, dimethyl succinate and terbutylhydroperoxide. Of these, a mixture of dimethylglutarate, dimethyladipate and dimethylsuccinate is preferred. The ester or esters are present in the liquid hardenable resin component in an amount in the range of from about 0.1% to about 3% by weight of the liquid hardenable resin component, preferably in an amount of about 2%.

Examples of surfactants which can be utilized in the liquid hardenable resin component for facilitating the coating of the resin on the proppant particles and for causing the hardenable resin to flow to the contact points between adjacent resin coated proppant particles include, but are not limited to, an ethoxylated nonylphenol phosphate ester, mixtures of one or more cationic surfactants and one or more non-ionic surfactants and an alkyl phosphonate surfactant. The mixtures of one or more cationic and non-ionic surfactants which can be utilized are described in U.S. Pat. No. 6,311,773 issued to Todd et al. on Nov. 6, 2001 which is incorporated herein by reference. Of the surfactants that can be used, a $C_{12}$–$C_{22}$ alkyl phosphonate surfactant is preferred. The surfactant or surfactants utilized are included in the liquid hardenable resin component in an amount in the range of from about 2% to about 15% by weight of the liquid hardenable resin component, preferably in an amount of about 12%.

The liquid carrier fluid having a high flash point (above about 125° F) in the liquid hardening agent component is selected from the group consisting of dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene and fatty acid methyl esters. Of these, dipropylene glycol methyl ether is preferred. The liquid carrier fluid is present in the liquid hardening agent component in an amount in the range of from about 30% to about 60% by weight of the liquid hardening agent component, preferably in an amount of about 40%.

Examples of viscosifying agents that can optionally be utilized in the liquid hardening agent component, include, but are not limited to hydroxypropyl cellulose and organophilic clays. Of these, organophilic clay is preferred. Organophilic clays are the reaction product of purified smectite clay (either hectorite or bentonite) and a quaternary ammonium salt. The viscosifying agent is present in the liquid hardening agent component in an amount in the range of from about 0% to about 3% by weight of the liquid hardening agent component, preferably in an amount of about 1%.

Examples of aqueous rubber latexes, i.e., aqueous dispersions or emulsions, which can be used in the liquid rubber component include, but are not limited to, natural rubber (cis-1,4-polyisoprene) latex, styrene/butadiene rubber latex, cis-1,4-polybutadiene rubber latex, butyl rubber latex, ethylene/propylene rubber latex, neoprene rubber latex, nitrile rubber latex, silicone rubber latex, chlorosulfonated rubber latex, polyethylene rubber latex, epichlorohydrin rubber latex, fluorocarbon rubber latex, fluorosilicone rubber latex, polyurethane rubber latex, polyacrylic rubber latex and polysulfide rubber latex.

Of the various latexes which can be utilized, those prepared by emulsion polymerization processes are preferred. A particularly preferred latex for use in accordance with this invention is a styrene/butadiene copolymer latex emulsion prepared by emulsion polymerization. The aqueous phase of the emulsion is an aqueous colloidal dispersion of the styrene/butadiene copolymer. The latex dispersion usually includes water in an amount in the range of from about 40% to about 70% by weight of the latex, and in addition to the dispersed styrene/butadiene particles, the latex often includes small quantities of an emulsifier, polymerization catalysts, chain modifying agents and the like. The weight ratio of styrene to butadiene in the latex can range from about 10%:90% to about 90%:10%.

A particularly suitable styrene/butadiene aqueous latex has a styrene/butadiene weight ratio of about 25%:75%, and the styrene/butadiene copolymer is suspended in a 50% by weight aqueous emulsion A latex of this type is available from Halliburton Energy Services of Duncan, Okla. under the trade designation "LATEX 2000™." The amount of the rubber latex utilized in the liquid rubber component is in the range of from about 99.9% to about 97% by weight of the liquid rubber component, preferably in an amount of about 99%.

In order to prevent the aqueous rubber latex from prematurely coagulating and increasing the viscosity of the liquid rubber component, an effective amount of a latex stabilizer is included in the liquid rubber component. Latex stabilizers are comprised of one or more surfactants which function to prevent latex coagulation. Examples of rubber latex stabilizing surfactants which can be utilized in the liquid rubber component include, but are not limited to, surfactants having the formula R—Ph—O(OCH$_2$CH$_2$)$_m$OH wherein R is an alkyl group having from about 5 to about 30 carbon atoms, Ph is phenyl and m is an integer of from about 5 to about 50 and surfactants having the formula wherein $R_1(R_2O)_nSO_3X$ wherein $R_1$ is an alkyl group having from about 5 to about 20 carbon atoms, $R_2$ is the group —$CH_2$—$CH_2$—, n is an integer from about 10 to about 40 and X is a cation. Of the various latex stabilizing surfactants which can be utilized, a sulfonated and ethoxylated sodium salt having the formula $H(CH_2)_{12-15}(CH_2CH_2O)_{15}SO_3Na$ is preferred. The rubber latex stabilizing surfactant utilized is included in the liquid rubber component in an amount in the range of from about 0.1% to about 3% by weight of the liquid rubber component, more preferably in an amount of about 1%.

The liquid hardenable resin component is included in the liquid hardenable resin composition in an amount in the range of from about 40% to about 55% by weight of the liquid hardenable resin composition, preferably about 48%. The liquid hardening agent component is included in the liquid hardenable resin composition in an amount in the range of from about 25% to about 35% by weight of the liquid hardenable resin composition, preferably about 32%. The liquid rubber component is included in the liquid hardenable resin composition in an amount in the range of from about 10% to about 35% by weight of the liquid hardenable resin composition, preferably about 20%.

A variety of fracturing fluids can be utilized in accordance with the present invention including aqueous gels, emulsions and other fluids used for forming fractures in subterranean zones and carrying resin composition coated proppant particles into the fractures. The aqueous gels are generally comprised of water and one or more gelling agents. The emulsions can be comprised of two immiscible liquids such as an aqueous gelled liquid and a liquefied, normally gaseous fluid such as nitrogen.

The preferred fracturing fluids for use in accordance with this invention are aqueous gels comprised of water, a gelling agent for gelling the water and increasing its viscosity, and optionally, a cross-linking agent for cross-linking the gel and further increasing the viscosity of the fluid. The increased viscosity of the gelled or gelled and cross-linked fracturing fluid reduces fluid loss and allows the fracturing fluid to transport significant quantities of suspended proppant particles. The water utilized to form the fracturing fluid can be fresh water, salt water, brine, seawater or any other aqueous liquid which does not adversely react with the other components utilized in accordance with this invention.

A variety of gelling agents can be utilized including hydratable polymers which contain one or more functional groups such as hydroxyl, cis-hydroxyl, carboxyl, sulfate, sulfonate, amino or amide. Particularly useful polymers are polysaccharides and derivatives thereof which contain one or more monosaccharide units galactose, mannose, glucoside, glucose, xylose, arabinose, fructose, glucuronic acid or pyranosyl sulfate. Examples of natural hydratable polymers containing the foregoing functional groups and units which are particularly useful in accordance with the present invention include guar gum and derivatives thereof such as hydroxypropyl guar and cellulose derivatives such as hydroxyethylcellulose. Hydratable synthetic polymers and copolymers which contain the above mentioned functional groups can also be utilized. Examples of such synthetic polymers include, but are not limited to, polyacrylate, polymethacrylate, polyacrylamide, polyvinyl alcohol and polyvinyl pyrrolidone. The gelling agent used is generally combined with the water in the fracturing fluid in an amount in the range of from about 0.1% to about 1% by weight of the water.

Examples of cross-linking agents which can be utilized to further increase the viscosity of a gelled fracturing fluid are: alkali metal borates, borax, boric acid and compounds which are capable of releasing multi-valent metal ions in aqueous solutions. Examples of the multi-valent metal ions are chromium, zirconium, antimony, titanium, iron, zinc or aluminum. When used, the cross-linking agent is generally added to gelled water in an amount in the range of from above 0.01% to about 1% by weight of the water.

The above described gelled or gelled and cross-linked fracturing fluids typically also include internal delayed gel breakers such as those of the enzyme type, the oxidizing type, the acid buffer type and the temperature activated type, all of which are well known to those skilled in the art. Particularly suitable delayed gel breakers include, but are not limited to, alkali metal and ammonium persulfates which are delayed by being encapsulated in a material that slowly releases the breaker and alkali metal chlorites, alkali metal hypochlorites and calcium hypochlorite. The gel breakers cause the viscous fracturing fluids to revert to thin fluids that can be produced back to the surface after they have been used to place proppant particles in subterranean fractures. The gel breaker used is generally present in the fracturing fluid in an amount in the range of from about 1% to about 5% by weight of the gelling agent therein. The fracturing fluids can also include one or more of a variety of well known additives such as gel stabilizers, fluid loss control additives, clay stabilizers, bacteriacides and the like.

The proppant particles utilized in accordance with the present invention are generally of a size such that formation particulate solids, e.g., sand and other solid fines, which migrate with produced fluids are prevented from being produced from the subterranean zone. Various kinds of proppant particles can be utilized including graded sand, bauxite, ceramic materials, glass materials, walnut hulls, polymer beads and the like. Generally, the proppant particles have a size in the range of from about 2 to about 400 mesh, U.S. Sieve Series. The preferred proppant is graded sand having a particle size in the range of from about 10 to about 70 mesh, U.S. Sieve Series. Preferred sand particle size distribution ranges are one or more of 10–20 mesh, 20–40 mesh, 40–60 mesh or 50–70 mesh, depending on the particular size and distribution of formation solids to be screened out by the consolidated proppant particles.

The liquid hardenable resin compositions of this invention are utilized for consolidating proppant particles in subterranean fractures whereby consolidated proppant particle packs are formed which are resilient and prevent the production of formation sand and fines as well as proppant particle flow-back due to stress cycling or the like. The compositions are basically comprised of a hardenable resin, optionally a solvent for the resin having a high flash point, a hardening agent for hardening the resin, a silane coupling agent, a hydrolyzable ester for breaking gelled fracturing films on the proppant particles, a surfactant for facilitating the coating of the resin on the proppant particles and for causing the hardenable resin to flow to the contact points between adjacent resin coated proppant particles, a liquid carrier fluid having a high flash point, optionally a viscosifying agent for viscosifying the carrier fluid and dispersing the hardening agent when the hardening agent is a particulate solid, a rubber latex and a rubber latex stabilizing surfactant.

The various components of the liquid hardenable resin composition are the same as those described above in connection with the methods of this invention and are utilized in the amounts set forth above.

A preferred method of the present invention for forming fractures in a subterranean zone containing resilient proppant particle packs which prevent the production of formation sand and fines with produced fluids and proppant flow-back is comprised of the steps of: (a) providing a liquid hardenable resin component comprised of bisphenol A-epichlorohydrin resin present in an amount in the range of from about 70% to about 100% by weight of the liquid hardenable resin component and a solvent for the resin comprised of dipropylene glycol methyl ether present in an amount in the range of from about 0% to about 30% by weight of the liquid hardenable resin component; (b) providing a liquid hardening agent component comprised of a 4,4-diaminodiphenylsulfone hardening agent present in an amount in the range of from about 40% to about 60% by weight of the liquid hardening agent component, a silane coupling agent comprised of n-beta-(aminoethyl)-gamma-aminopropyltrimethoxysilane present in an amount in the range of from about 0.1% to about 3% by weight of the liquid hardenable resin component, a hydrolyzable ester mixture comprised of dimethylglutarate, dimethyladipate and dimethylsuccinate present in an amount in the range of from about 0.1% to about 3% by weight of the liquid hardenable resin component and a surfactant comprised of a $C_{12}$–$C_{22}$ alkylphosphonate present in an amount in the range of from about 2% to about 15% by weight of the liquid hardenable resin component, a liquid carrier fluid comprised of dipropylene glycol methyl ether present in an amount in the range of from about 20% to about 40% by weight of the liquid hardenable resin component and a viscosifying agent comprised of an organophilic clay present in an amount in the range of from about 0% to about 3% by weight of the liquid hardenable resin component; (c) providing a liquid rubber comprised of a styrene/butadiene copolymer latex containing water in an amount of about 50% by weight of the latex present in an amount in the range of from about 99.9% to about 97% by weight of the liquid rubber component and a rubber latex stabilizing surfactant comprised of a sulfonated and ethoxylated sodium salt having the formula $H(CH_2)_{12-15}(CH_2CH_2O)_{15}SO_3Na$ present in an amount in the range of from about 0.1% to about 3% by weight of the liquid rubber component; (d) providing a source of dry proppant particles; (e) providing a gelled liquid fracturing fluid; (f) pumping the gelled liquid fracturing fluid into the subterranean zone to form the fractures therein and to place hardenable resin composition coated proppant particles therein;(g) as the fractures are formed in step (f), mixing the liquid hardenable resin component with the liquid hardening agent component and the liquid rubber component to form a liquid hardenable resin composition; (h) coating the liquid hardenable resin composition provided in step (g) onto dry proppant particles conveyed from the source thereof to form hardenable resin composition coated proppant particles; (i) mixing the hardenable resin coated proppant particles produced in step (h) with the fracturing fluid pumped in accordance with step (f) whereby the hardenable resin composition coated proppant particles are suspended therein; (j) terminating steps (f), (g), (h) and (i) when the resin composition coated proppant particles have been placed in the fractures; and (k) allowing the hardenable resin composition on the resin composition coated proppant particles to harden and consolidate said proppant particles into resilient permeable packs which prevent proppant flow-back.

A preferred liquid hardenable resin composition of this invention for consolidating proppant particles in subterranean fractures whereby consolidated proppant particle packs are formed which are resilient and prevent the production of formation sand and fines with produced fluids and proppant particle flow-back comprises: a hardenable resin present in an amount in the range of from about 70% to about 100% by weight of the liquid hardenable resin composition; a solvent for the resin present in an amount in the range of from about 0% to about 30% by weight of the liquid hardenable resin composition; a hardening agent present in an amount in the range of from about 40% to about 60% by weight of the liquid hardenable resin composition; a silane coupling agent present in an amount in the range of from about 0.1% to about 3% by weight of the liquid hardenable resin composition; a hydrolyzable ester present in an amount in the range of from about 0.1% to about 3% by weight of the liquid hardenable resin composition; a surfactant present in an amount in the range of from about 2% to about 15% by weight of the liquid hardenable resin composition; a liquid carrier fluid comprised of dipropylene glycol methyl ether present in an amount in the range of from about 20% to about 40% by weight of the liquid hardenable resin component; a viscosifying agent comprised of an organophilic clay present in an amount in the range of from about 0% to about 3% by weight of the liquid hardenable resin composition; a rubber latex present in an amount in the range of from about 0.1% to about 40% by weight of the liquid hardenable resin composition; and a rubber latex stabilizing surfactant present in an amount in the range of from about 0.1% to about 10% by weight of the liquid hardenable resin composition.

In order to further illustrate the methods and compositions of this invention, the following examples are given.

EXAMPLE

A resin composition was prepared by mixing 8.2 milliliters of liquid hardenable resin component, 5.3 milliliters of liquid hardening agent component, and 3.4 milliliters of liquid latex agent. These components were mixed well to form a homogeneous mixture. A volume of 9.0 milliliters of this mixture was dry coated onto 250 grams of 20/40-mesh bauxite proppant. The treated proppant was then added to 300 milliliters of 35 lb per 1,000-gal carboxymethylhydroxypropyl guar fracturing fluid while the fluid was stirring with a stirrer. The slurry was placed in a heat bath at 180° F. and continued to be stirred for 15 minutes to simulate the proppant slurry when it is being pumped downhole. After stirring, the treated proppant was packed in the flow chambers and placed in oven for 3-hour cure at 325° F. without applying closure stress.

After curing, consolidated cores were obtained for unconfined compressive strength measurements and stress cycling testing. An average value of 470 psi compressive strength was obtained for the consolidated cores. For stress cycling testing, the consolidated proppant cores were installed in a confining cell. Axial stress and confining pressure were increased to 1,000 psi. Confining pressure was held at 1,000 psi, while the axial stress was increased to 2,700 psi, held constant for 10 minutes, decreased to 1,100 psi and held constant for another 10 minutes. The axial stress cycle was repeated 19 times for a total of 20 cycles. The core samples appeared to stabilize after about 10 cycles. The core samples were intact when removed at the end of the test. This result indicates that the addition of latex as a flexibilizing agent greatly improves the capability of a consolidated proppant pack to undergo stress cycling due to frequent shut-ins and returns to production.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. A method of forming fractures in a subterranean zone containing resilient proppant particle packs which prevent the production of formation sand and fines with produced fluids and proppant flow-back comprising the steps of:
   (a) providing a liquid hardenable resin component comprised of a hardenable resin;
   (b) providing a liquid hardening agent component comprised of a hardening agent;
   (c) providing a liquid rubber component comprised of a rubber latex and a rubber latex stabilizing surfactant;
   (d) providing a source of dry proppant particles;
   (e) providing a gelled liquid fracturing fluid;
   (f) pumping said gelled liquid fracturing fluid into said subterranean zone to form said fractures therein and to place hardenable resin composition coated proppant particles therein;
   (g) as said fractures are formed in step (f), mixing said liquid hardenable resin component with said liquid hardening agent component and said liquid rubber component to form a liquid hardenable resin composition;
   (h) coating said liquid hardenable resin composition produced in step (g) onto dry proppant particles conveyed from said source thereof to form hardenable resin composition coated proppant particles;
   (i) mixing said hardenable resin composition coated proppant particles produced in step (h) with said fracturing fluid pumped in accordance with step (f) whereby said hardenable resin composition coated proppant particles are suspended therein;
   (j) terminating steps (f), (g), (h) and (i) when said resin composition coated proppant particles have been placed in said fractures; and
   (k) allowing said hardenable resin composition on said hardenable resin composition coated proppant particles to harden and consolidate said proppant particles into resilient permeable packs which prevent the production of formation sand and fines with produced fluids and proppant flow-back.

2. The method of claim 1 wherein said hardenable resin in said liquid hardenable resin component is an organic resin comprising one or more members selected from the group consisting of bisphenol A-epichlorohydrin resin, polyepoxide resin, novolak resin, polyester resin, phenol-aldehyde resin, urea-aldehyde resin, furan resin, urethane resin and glycidyl ether.

3. The method of claim 1 wherein said hardenable resin in said liquid hardenable resin component is comprised of a bisphenol A-epichlorohydrin resin.

4. The method of claim 1 which further comprises a solvent for said resin in said liquid hardenable resin component.

5. The method of claim 4 wherein said solvent for said resin in said liquid hardenable resin component comprises one or more members selected from the group consisting of dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene and fatty acid methyl esters.

6. The method of claim 4 wherein said solvent for said resin in said liquid hardenable resin component is comprised of dipropylene glycol methyl ether.

7. The method of claim 1 wherein said hardening agent in said liquid hardening agent component comprises one or more members selected from the group consisting of amines, aromatic amines, polyamines, aliphatic amines, amides, polyamides, 4,4'-diaminodiphenyl sulfone, 2-ethyl-4-methyl imidazole and 1,1,3-trichlorotrifluoroacetone.

8. The method of claim 1 wherein said liquid hardening agent component includes a silane coupling agent, a hydrolyzable ester for breaking gelled fracturing fluid films on said proppant particles and a surfactant for facilitating the coating of said resin on said proppant particles and for causing said hardenable resin to flow to the contact points between adjacent resin coated proppant particles and a liquid carrier fluid.

9. The method of claim 8 wherein said silane coupling agent in said liquid hardening agent component comprises one or more members selected from the group consisting of N-2-(aminoethyl)-3-aminopropyltrimethoxysilane, 3-glycidoxypropyltrimethoxysilane and n-beta-(aminoethyl)-gamma-aminopropyl trimethoxysilane.

10. The method of claim 8 wherein said silane coupling agent in said liquid hardening agent component is comprised of n-beta-(aminoethyl)-gamma-aminopropyl trimethoxysilane.

11. The method of claim 8 wherein said hydrolyzable ester for breaking gelled fracturing fluid films on said proppant particles in said liquid hardening agent component comprises one or more members selected from the group consisting of a mixture of dimethylgulutarte, dimethyladipate and dimethylsuccinate, sorbitol, catechol, dimethylthiolate, methyl salicylate, dimethyl salicylate, dimethyl succinate and ter-butylhydroperoxide.

12. The method of claim 8 wherein said hydrolyzable ester for breaking gelled fracturing fluid films on said proppant particles in said liquid hardening agent component is a mixture of dimethylglutarate, dimethyladipate and dimethylsuccinate.

13. The method of claim 8 wherein said surfactant for facilitating the coating of said resin on said proppant particles and for causing said hardenable resin to flow to the contact points between adjacent resin coated proppant particles in said liquid hardening agent component is selected from the group consisting of an ethoxylated nonyl phenol phosphate ester, mixtures of one or more cationic surfactants and one or more non-ionic surfactants and a $C_{12}$–$C_{22}$ alkyl phosphonate surfactant.

14. The method of claim 8 wherein said surfactant for facilitating the coating of said resin on said proppant particles and for causing said hardenable resin to flow to the contact points between adjacent resin coated proppant particles in said liquid hardening agent component is a $C_{12}$–$C_{22}$ alkyl phosphonate surfactant.

15. The method of claim 8 wherein said liquid carrier fluid in said liquid hardening agent component comprises one or more members selected from the group consisting of dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene and fatty acid methyl esters.

16. The method of claim 8 wherein said liquid carrier fluid in said liquid hardening agent component is comprised of dipropylene glycol methyl ether.

17. The method of claim 8 which further comprises a viscosifying agent in said liquid hardening gent component for viscosifying said carrier fluid and dispersing said hardening agent when said hardening agent is a particulate solid.

18. The method of claim 17 wherein said viscosifying agent in said liquid hardening agent component is comprised of a member selected from the group consisting of hydroxypropylcellulose and organophilic clays.

19. The method of claim 17 wherein said viscosifying agent in said liquid hardening agent component is the reaction product of a smectite clay and a quaternary ammonium salt.

20. The method of claim 1 wherein said rubber latex in said liquid rubber component comprises one or more members selected from the group consisting of natural rubber (cis-1,4-polyisoprene) latex, styrene/butadiene copolymer latex, cis-1,4-polybutadiene rubber latex, butyl rubber latex, ethylene/propylene rubber latex, neoprene rubber latex, nitrile rubber latex, silicone rubber latex, chlorosulfonated rubber latex, polyethylene rubber latex, epichlorohydrin rubber latex, fluorocarbon rubber latex, fluorosilicone rubber latex, polyurethane rubber latex, polyacrylic rubber latex and polysulfide rubber latex.

21. The method of claim 1 wherein said rubber latex in said liquid rubber component is comprised of a styrene/butadiene copolymer latex containing water in an amount in the range of from about 50% by weight of said latex.

22. The method of claim 1 wherein said rubber latex stabilizing surfactant in said liquid rubber component comprises one or more members selected from the group consisting of surfactants having the formula R—Ph—O(OCH$_2$CH$_2$)$_m$OH wherein R is an alkyl group having from about 5 to about 30 carbon atoms, Ph is phenyl and m is an integer of from about 5 to about 50 and surfactants having the formula R$_1$(R$_2$O)$_n$SO$_3$X wherein R$_1$ is an alkyl group having from about 5 to about 20 carbon atoms, R$_2$ is the group —CH$_2$—CH$_2$—, n is an integer from about 10 to about 40 and X is a cation.

23. The method of claim 1 wherein said rubber latex stabilizing surfactant in said liquid rubber component is comprised of a sulfonated and ethoxylated sodium salt having the formula H(CH$_2$)$_{12-15}$(CH$_2$CH$_2$O)$_{15}$SO$_3$Na.

24. A method of forming fractures in a subterranean zone containing resilient proppant particle packs which prevent the production of formation sand and fines with produced fluids and proppant flow-back comprising the steps of:

(a) providing a liquid hardenable resin component comprised of bisphenol A-epichlorohydrin resin present in an amount in the range of from about 70% to about 100% by weight of said liquid hardenable resin component and a solvent for said resin comprised of dipropylene glycol methyl ether present in an amount in the range of from 0% to about 30% by weight of said liquid hardenable resin component;

(b) providing a liquid hardening agent component comprised of a 4,4-diaminodiphenyl sulfone hardening agent present in an amount in the range of from about 30% to about 60% by weight of said liquid hardening agent component, a silane coupling agent comprised of n-beta-(aminoethyl)-gamma-aminopropyltrimethoxysilane present in an amount in the range of from about 0.1% to about 3% by weight of said liquid hardening agent component, a hydrolyzable ester mixture comprised of dimethylglutarate, dimethyladipate and dimethylsuccinate present in an amount in the range of from about 0.1% to about 3% by weight of said liquid hardening agent component, a surfactant comprised of a C$_{12}$–C$_{22}$ alkyl phosphonate present in an amount in the range of from about 2% to about 15% by weight of said liquid hardening agent component, a liquid carrier fluid comprised of dipropylene glycol methyl ether present in an amount in the range of from about 30% to about 60% by weight of said hardening agent component and a viscosifying agent comprised of the reaction product of a smectite clay and a quaternary ammonium salt present in an amount in the range of from 0% to about 3% by weight of said liquid hardening agent component;

(c) providing a liquid rubber component comprised of a styrene/butadiene copolymer latex containing water in an amount of about 50% by weight of said latex present in an amount in the range of from about 99.9% to about 97% by weight of said liquid rubber component and a rubber latex stabilizing surfactant comprised of a sulfonated and ethoxylated sodium salt having the formula H(CH$_2$)$_{12-15}$(CH$_2$CH$_2$O)$_{15}$SO$_3$Na present in an amount in the range of from about 0.1% to about 3% by weight of said liquid hardening agent component;

(d) providing a source of dry proppant particles;

(e) providing a gelled liquid fracturing fluid;

(f) pumping said gelled liquid fracturing fluid into said subterranean zone to form said fractures therein and to place hardenable resin composition coated proppant particles therein;

(g) as said fractures are formed in step (f), mixing said liquid hardenable resin component with said liquid hardening agent component and said liquid rubber component to form a liquid hardenable resin composition;

(h) coating said liquid hardenable resin composition produced in step (g) onto dry proppant particles conveyed from said source thereof to form hardenable resin composition coated proppant particles;

(i) mixing said hardenable resin coated proppant particles produced in step (h) with said fracturing fluid pumped in accordance with step (e) whereby said hardenable resin composition coated proppant particles are suspended therein;

(j) terminating steps (f), (g), (h) and (i) when said resin composition coated proppant particles have been placed in said one or more fractures; and (k) allowing said hardenable resin composition on said resin composition coated proppant particles to harden and consolidate said proppant particles into one or more high strength resilient permeable packs which prevent the production of formation sand and fines with produced fluids and proppant flow-back.

25. The method of claim 24 wherein said bisphenol A-epichlorohydrin resin is present in an amount of about 85% by weight of said liquid hardenable resin component.

26. The method of claim 24 wherein said dipropylene glycol methyl ether solvent is present in an amount of about 15% by weight of said liquid hardenable resin component.

27. The method of claim 24 wherein said 4,4-diaminodiphenyl sulfone hardening agent is present in an amount of about 40% by weight of said liquid hardening agent component.

28. The method of claim 24 wherein said n-beta-(aminoethyl)-gamma-aminopropyltrimethoxysilane is present in an amount of about 1.5% by weight of said liquid hardenable resin component.

29. The method of claim 24 wherein said hydrolyzable ester mixture comprised of dimethylglutarate, dimethyladipate and dimethylsuccinate is present in an amount of about 2% by weight of said liquid hardenable resin component.

30. The method of claim 24 wherein said surfactant comprised of a $C_{12}$–$C_{22}$ alkyl phosphonate is present in an amount of about 12% by weight of said liquid hardenable resin component.

31. The method of claim 24 wherein said dipropylene glycol methyl ether carrier fluid is present in an amount of about 40% by weight of said hardening agent component.

32. The method of claim 24 wherein said reaction product of a smectite clay and a quaternary ammonium salt viscosifying agent is present in an amount of about 3% by weight of said hardening agent component.

33. The method of claim 24 wherein said styrene/butadiene copolymer latex containing water in an amount of about 50% by weight of said latex is present in an amount of about 99% by weight of said liquid rubber component.

34. The method of claim 24 wherein said rubber latex stabilizing surfactant comprised of a sulfonated and ethoxylated sodium salt having the formula $H(CH_2)_{12-15}(CH_2CH_2O)_{15}SO_3Na$ is present in an amount of about 1% by weight of said liquid rubber component.

* * * * *